US008954988B1

(12) United States Patent
Laredo et al.

(10) Patent No.: US 8,954,988 B1
(45) Date of Patent: Feb. 10, 2015

(54) AUTOMATED ASSESSMENT OF TERMS OF SERVICE IN AN API MARKETPLACE

(71) Applicant: International Business Machines Corporation, Armonk, NY (US)

(72) Inventors: Jim A. Laredo, Katonah, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/054,449

(22) Filed: Oct. 15, 2013

(51) Int. Cl.
*G06F 13/00* (2006.01)
*G06F 9/54* (2006.01)

(52) U.S. Cl.
CPC ....................................... *G06F 9/54* (2013.01)
USPC ........................................... 719/310; 719/328

(58) Field of Classification Search
CPC ................................. G06F 9/451; H04L 29/06
USPC .................................................. 719/310, 328
See application file for complete search history.

(56) References Cited

U.S. PATENT DOCUMENTS

| 8,429,630 | B2 | 4/2013 | Nickolov et al. |
| 8,468,090 | B2 | 6/2013 | Lesandro et al. |
| 2003/0078800 | A1* | 4/2003 | Salle et al. ........... 705/1 |
| 2007/0233690 | A1 | 10/2007 | Bruchlos et al. |
| 2009/0012914 | A1* | 1/2009 | Burchfield et al. ........... 705/400 |
| 2009/0249369 | A1* | 10/2009 | Itoh et al. ...................... 719/328 |
| 2012/0069131 | A1 | 3/2012 | Abelow |
| 2012/0166310 | A1 | 6/2012 | Werklund et al. |
| 2013/0074131 | A1* | 3/2013 | Cerveau et al. ................ 725/88 |
| 2013/0080911 | A1 | 3/2013 | Klemm |
| 2013/0297655 | A1* | 11/2013 | Narasayya et al. ........... 707/791 |

FOREIGN PATENT DOCUMENTS

| WO | 2013045972 A1 | 4/2013 |
| WO | 2013090150 A1 | 6/2013 |

OTHER PUBLICATIONS

Ahmadi et al., "Flexible Matching and Ranking of Web Service Advertisements," Proceedings of the 2nd Workshop on Middleware for Service Oriented Computing (MW4SOC'07), Nov. 2007, pp. 30-35.

Altmann et al., "INDEX project: user support for buying QoS with regard to user's preferences," Sixth International Workshop on Quality of Service (IWQoS98), May 1998, pp. 101-104.

Bianchini et al., "Semantics-enabled Web APIs selection patterns," 15th International Database Engineering & Applications Symposium (IDEAS11), Sep. 2011, pp. 204-208.

(Continued)

*Primary Examiner* — Andy Ho
(74) *Attorney, Agent, or Firm* — Yee & Associates, P.C.; Louis J. Percello

(57) ABSTRACT

An embodiment of the invention comprising a method is associated with an API marketplace, wherein one or more API providers can each supply an API of a specified type, and each provider has a set of ToS for its API of the specified type. The method includes, responsive to an API consumer having a need for an API of the specified type, obtaining the ToS of each of the API providers. The method further includes implementing an automated process to determine differences between the ToS of a given API provider, and a ToS required by the API consumer. The ToS differences determined for respective API providers are used to decide whether to select a particular one of the API providers to supply an API of the specified type to the API consumer.

20 Claims, 6 Drawing Sheets

(56) References Cited

OTHER PUBLICATIONS

Bromberg et al., "Interoperability of Service Discovery Protocols: Transparent versus Explicit Approaches," 15th IST Mobile & Wireless Communications Summit, Jun. 2006, 5 pages.

Jin et al., "Classification and Comparison of QoS Specification Languages for Distributed Multimedia Applications," Department of Computer Science, University of Illinois at Urbana-Champaign Technical Report UIUCDCS-R-2002-2302/UILU-ENG-2002-1745, Nov. 2002, 12 pages.

* cited by examiner

ToS REQUIREMENTS OF API CONSUMER

| ATTRIBUTE | VALUE | USER ROLE/AFFECTS | REQUIREMENT |
|---|---|---|---|
| AVAILABILITY | 99.9 | CONSUMER | OPTIONAL |
| USER ELIGIBILITY | US ONLY | CONSUMER | OPTIONAL |
| BRAND USAGE LIMITATION BY PROVIDER | LIMITED | CONSUMER | MANDATORY |

302

312 — AVAILABILITY row
314 — USER ELIGIBILITY row
316 — BRAND USAGE LIMITATION BY PROVIDER row ToS PROVIDED BY API PROVIDER

| ATTRIBUTE | VALUE | USER ROLE/AFFECTS |
|---|---|---|
| AVAILABILITY | 97 | CONSUMER |
| USER ELIGIBILITY | US ONLY | CONSUMER |
| BRAND USAGE LIMITATION BY PROVIDER | NOT LIMITED | CONSUMER |

304

306 — AVAILABILITY row
308 — USER ELIGIBILITY row
310 — BRAND USAGE LIMITATION BY PROVIDER row

FIG. 3

AUTOMATED ASSESSMENT OF TERMS OF SERVICE IN AN API MARKETPLACE

BACKGROUND

1. Field

The invention disclosed and claimed herein generally pertains to a method and system for automatically assessing the Terms of Service (ToS) associated with one or more API providers. More particularly, the invention pertains to a method and system of the above type for enabling an API consumer, or other user that has its own required ToS, to readily determine the differences between its own required ToS and the ToS of respective API providers.

2. Description of the Related Art

When an application is developed, the developer may need to use one or more Application Programming Interfaces (APIs), in order to gain access to one or more respectively related services. This can cause the developer or other API consumer to go to an API marketplace to locate API providers who can supply the needed APIs. However, each API provider will generally have its own ToS, and the API consumer may also require its own ToS. Accordingly, the API consumer must compare its own ToS requirements with the ToS of each API provider the consumer is considering, in order to determine the acceptability of each provider ToS. API consumers may have different ToS requirements depending on the type of the application they seek to develop (or type APIs they seek to use). Similarly, a freelance application developer and an application developer, who is part of a large development team at an enterprise may have different ToS requirements, resulting in a demand for ToS profiles.

At present, there are no systems for automatically and systematically assessing ToS amongst multiple providers, who can each supply the same type of API. As a result, comparisons of such ToS generally require a human intensive process. For a given ToS required by an API consumer, someone representing the API consumer must manually extract respective terms of an API provider ToS, and then compare each extracted term with a corresponding term of the consumer ToS. Tasks of this type typically are quite tedious and time-consuming. Moreover, persons carrying out the tasks may need to have a substantial amount of specialized knowledge of some type. If the API consumer requires a composite set, or pattern, of APIs, the above task can be even more difficult and challenging.

SUMMARY

In an arrangement wherein each of one or more API providers seeks to apply or attach a set of ToS to users of its respective API, embodiments of the invention enable automated assessment of each such ToS. These assessments determine differences or misalignment levels between the ToS of each of the API providers, and a set of ToS which is used or required by an API consumer. An assessment is carried out by extracting the content from each of respective components of the ToS of an API provider. The level of difference, or "delta," between each extracted component and a corresponding component of an API consumer ToS is then determined.

An embodiment of the invention comprising a computer implemented method is associated with an API marketplace, wherein one or more API providers can each supply an API of a specified type, and each provider has a set of ToS for its API of the specified type. The method includes the step of, responsive to an API consumer having a need for an API of the specified type, obtaining the ToS of at least a given one of the API providers. The method further comprises implementing an automated process to generate a set of data elements from selected content of the ToS of the given API provider. The set of data elements are used selectively with a specified data structure, to determine differences between the ToS of the given API provider, and a ToS of the API consumer. The ToS differences determined for respective API providers are used to decide whether to select a particular one of the API providers to supply an API of the specified type to the API consumer. As used herein, "API marketplace" refers to any environment in which different types of APIs are offered to others by API creators, or by other providers of APIs.

BRIEF DESCRIPTION OF THE SEVERAL VIEWS OF THE DRAWINGS

FIG. 3 is a schematic diagram pertaining to assessment of ToS gaps or differences.

DETAILED DESCRIPTION

Figure 1:
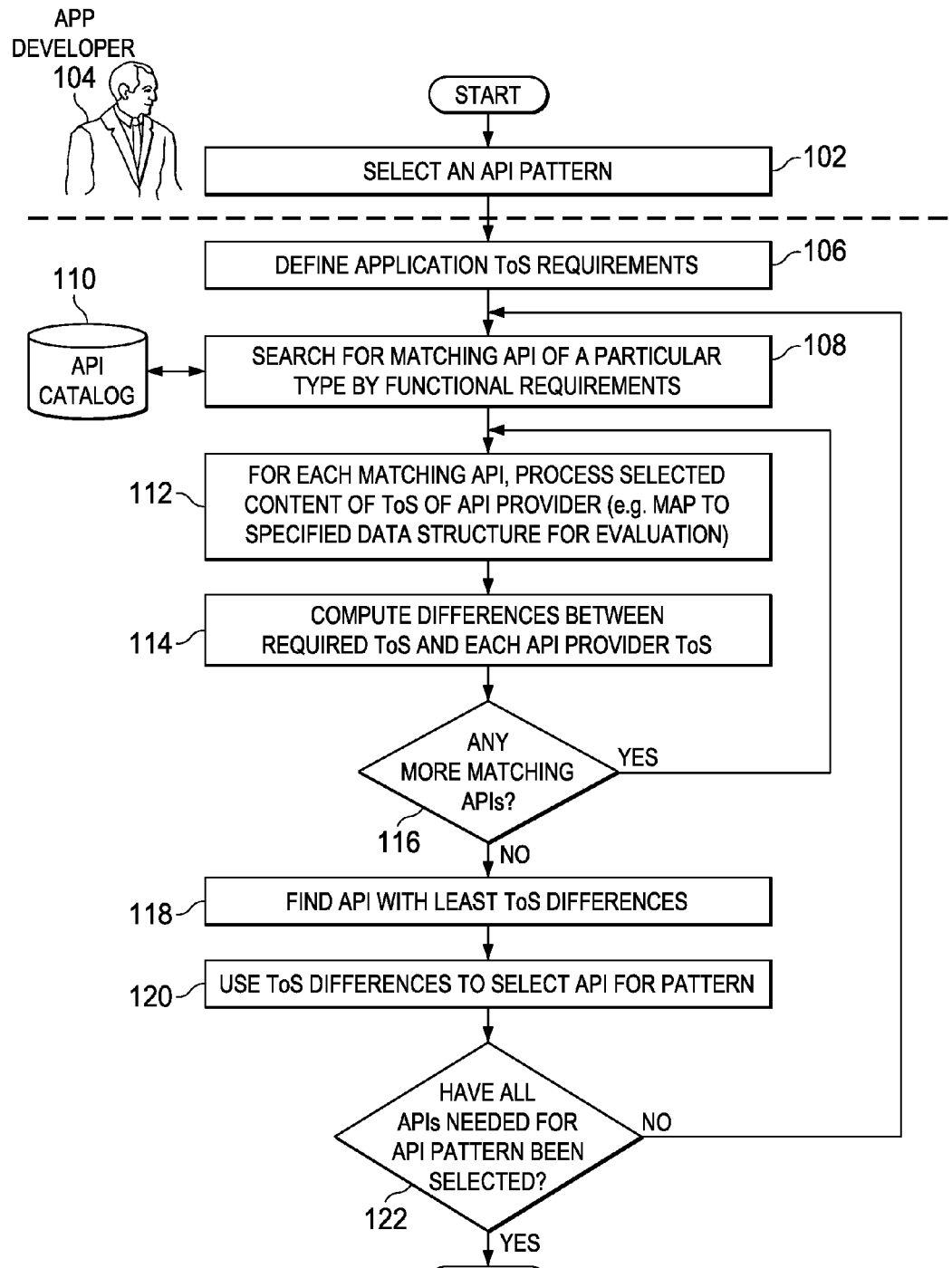
FIG. 1 is a flowchart that shows steps of a method comprising an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a flow chart that includes steps of a method comprising an embodiment of the invention. The embodiment could be used by an API consumer that needs an API, or alternatively needs multiple APIs of different types. As an example of a need for multiple APIs, the API consumer could be the developer of an application that carries out a composite service, i.e., performs two or more different services. In this situation, a user of the application would need to be able to access a number of different APIs, one for each service. Each API would be of a type that pertained to its corresponding service.

The complete set of APIs for a composite service of the above type is referred to by those of skill in the art as an API pattern for the composite service. The API set may also be referred to as an API template. FIG. 1 shows that the first step 102 of the method thereof is to select an API pattern for an application which has been developed, wherein the application requires a composite service as described above. The application may be created by a developer such as application developer 104.

As a simplified example, the API pattern of the application could be for a composite service wherein if a user checked into a specific location, she/he would receive a promotional tour of the location. For this example, the API pattern would need an API for a first service of checking in at the location, and would also need an API for a second service of sending the promotional offer. More generally, different areas or domains of service would tend to have different API providers, to furnish APIs particularly directed to the services of their respective service domains. Examples of these service domains include, without limitation, Event Management, SMS Communication, Photo Sharing, Payment Gateway, and Commerce Analytics.

FIG. 1 further shows that after determining, at step 102, all the different types of APIs that are needed for the API pattern of the application, it is necessary to define the Terms of Service (ToS) requirements for the application. As described above, an application developer, or other API consumer, generally has its own required ToS that it will want to use for API procurements. Accordingly, these ToS requirements, which pertain to APIs needed for the application, are defined or specified at step 106. However, as further described above, providers of APIs also have ToS that they will want to use for API procurements. As a result, substantial effort can be required to compare the ToS of the API consumer and an API provider, in order to conclude the procurement process. Moreover, this effort may be significantly increased if the procurement requires multiple APIs for a composite service, since the provider of each API could have its own ToS that needs to be compared with the API consumer ToS.

In the method of FIG. 1, as described hereinafter in further detail, an automated approach is used in connection with the above ToS comparisons. It is anticipated that this approach can significantly reduce the effort needed to carry out the comparison process. At step 108, the method of FIG. 1 searches for APIs that match a given one of the APIs required for the API pattern. More particularly, functional requirements of the given API are considered. These functional requirements, by way of example and not limitation, could include a particular type of operating system needed for the given API, a specific version of an operating system, and/or a specified minimum rate of operation achieved by the API.

Step 108 is implemented by looking for APIs, offered by various API providers in an API marketplace, that have the same functional requirements as the given API required for the pattern. Usefully, an API catalog 110 of provider offerings is accessed at step 108, as part of the search for matching APIs. It is anticipated that two or more API providers could be found, which each offered an API that matches the functional requirements of the given API needed for the pattern.

At step 112, the ToS of an API provider that offers a matching API, as described above, is selectively processed. More specifically, in accordance with embodiments of the invention, it has been recognized that the ToS of an API provider will generally include components or sections that respectively pertain to the same topics or subjects as are included in the ToS of the API consumer. However, the textual content of the two sets of ToS is likely to be quite different from each other, even for components of the same topic or subject. Accordingly, in a useful embodiment of the invention, step 112 of FIG. 1 carries out a process of automatically mapping the content of respective components of the ToS of an API provider to a specified data structure, such as a table, or a model such as a relationship graph. As a result of this process, respective terms of the API provider ToS are set up for a comparatively direct and straightforward comparison with corresponding terms of the API consumer ToS. The mapping process of step 112 is described hereinafter in further detail, in connection with FIG. 2.

At step 114 of FIG. 1, differences between the ToS of an API provider and the required ToS of the API consumer are determined or computed. Usefully, provider ToS content mapped to the specified data structure, as described above in connection with step 112, is used for this purpose. Computation of the ToS differences and implementation of step 114 is described hereinafter in further detail, in connection with FIG. 3 and FIG. 4.

Following step 114, a decision step 116 is carried out to determine whether there are any more API providers of an API that matches the given API required by the API consumer, as described above. If decision step 116 furnishes a positive result, the method of FIG. 1 returns to step 112. The method proceeds to step 118 if the decision of step 116 is negative.

At step 118, from the API providers that each matches or can supply the given API required for the API pattern, the provider having the least ToS differences with the API consumer ToS is determined. These least ToS differences are then used at step 120, to select a particular API provider to supply the given API to the API consumer. In one embodiment, the selected API provider would simply be the provider found at step 118 to have the least ToS differences overall. In another embodiment at step 120, certain terms of the ToS, such as a quality of service (QoS) term, would be weighted to be more important than other terms. Selection of the API provider would then be strongly influenced by ToS differences of the more heavily weighted terms.

Decision step 122 determines whether or not API providers have been selected for each API required by the API pattern. If so, the method of FIG. 1 ends, and otherwise the method returns to step 108.

Figure 2:
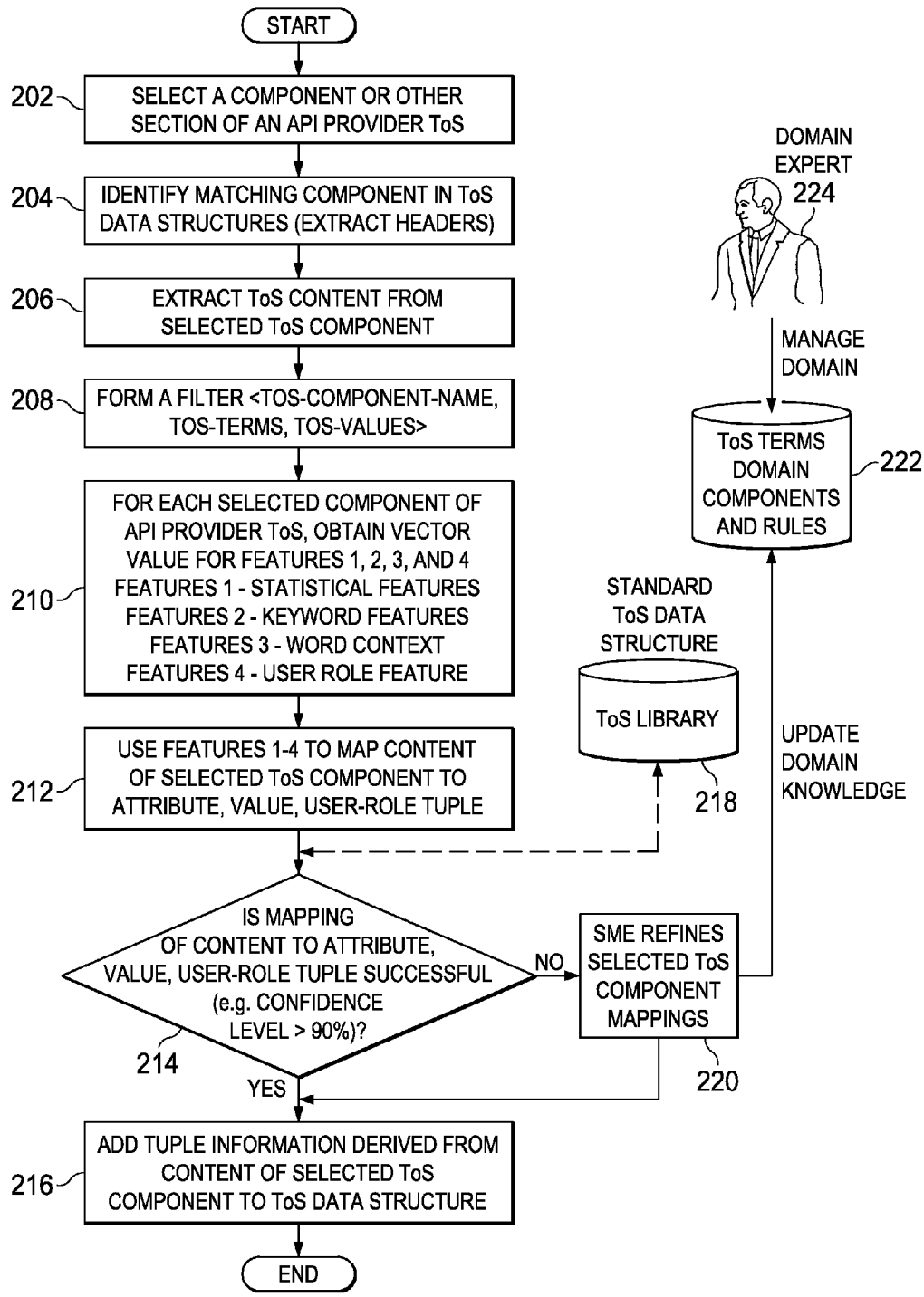
FIG. 2 is a flowchart associated with the embodiment of FIG. 1 that shows steps of a process pertaining to a ToS of an API provider, and more particularly to mapping information derived from content of the ToS to a specified data structure.

Referring to FIG. 2 there are shown steps of a process for analyzing content of the ToS of an API provider, wherein an API consumer is considering an API of the provider as described above in connection with FIG. 1. In accordance with embodiments of the invention, it has been recognized that while the textual content of the ToS of an API provider is likely to be quite different from the content required by the ToS of the API consumer, both ToS will typically include similar components, wherein each component is a textual portion or segment that pertains to a topical section, or to particular subject matter. Examples of such components that may commonly be found in ToS of both API consumers and API providers are set forth below. Each component is shown with a name or title, and also with key words related to the subject matter to which that component pertains.

1. Agreement
General agreement, user eligibility, provider liability
2. Privacy
Privacy, confidentiality, third party interactions (sites etc.)
3. Payment
Payment, refund, cancelation, suspension/resumption of services
4. Support
Warranty, support
5. Quality of Service
Capacity, availability
6. Legal
Local restrictions, geo restrictions (can service be used across the globe, etc.)
7. IP
Trademark, copyrights
8. Dictionary
Definitions of terminologies used, abbreviations In an exemplary embodiment of the invention associated with the process of FIG. 2, the above components are included in the required ToS of an API consumer. The API consumer uses significant words and terms of these components, such as the words and terms shown above, to construct a specified ToS data structure. These words and terms may also be used as keywords. The data structure is then used to compare content of the API consumer ToS with corresponding content of an API provider ToS, as described hereinafter in further detail. The specified data structure, by way of example, could be a table, or a set of tables, or could be a model such as a relationship graph, but is not limited thereto. Usefully, the specified data structure has a section or division pertaining to each component of the API consumer ToS.

After constructing the model or other data structure, the process of FIG. 2 analyzes textual content of respective components of an API provider ToS, such as by using text analytics or text data mining techniques. The analysis generally parses content extracted from a given ToS component into a tuple of data elements, such as a text vector. This provides a useful interpretation of the content extracted from the given component. The data tuple may then be mapped to or entered into the specified data structure, for the content comparison referred to above.

Referring more specifically to FIG. 2, the process thereof commences at step 202, by selecting a component of an API provider ToS. At step 204, a component section or division of the specified ToS data structure, which matches the provider ToS component selected at step 202, is identified. As an example, if the selected provider component pertains to the subject of Quality of Service, the Quality of Service division of the data structure or other most pertinent division will be identified. Also, associated headers or headings may be used for the identification purpose. At step 206, the content of the selected ToS component of the API provider is extracted.

FIG. 2 shows that a filter is formed at step 208. This filter processes the extracted content to obtain the name or other identifier of the selected provider ToS component. The filter also obtains terms and numeric values included in the extracted ToS content. Keywords, such as those referred to above in connection with the specified data structure, may be used in forming the filter.

Referring further to FIG. 2, an exemplary set of parsing tasks is performed at step 210, on the filtered content of the selected ToS component. This is done to produce a related set of Features 1-4. Information included in Features 1-4 is then mapped to, or used to generate or create, a data tuple that is associated with the specified data structure, as described above. This mapping is carried out at step 212.

Each Feature 1 is a statistical feature, which indicates the number of words in a portion of ToS content, and also indicates the position of a query word in the content portion. Query words, without limitation, could include values, keywords such as those referred to above, and other words associated with the specified data structure. Each Feature 2 is a keyword feature, which shows the keywords in a content portion. Each Feature 3 is a word context feature, which indicates words before and after the query word. Each Feature 4 is a user role feature, which derives the role of an application segment based on the user role, that is, whether the role is the provider or consumer.

At step 212, textual information included in Features 1-4 is used to map content of the selected ToS component to a set of data elements, or a data tuple comprising several data elements. In a useful embodiment of the invention, this mapping is carried out by means of an automated text analytics or text data mining procedure. In a further embodiment, one of the data elements of the tuple comprises a particular attribute of the selected ToS component, which is derived from textual content of that component. The other data elements of the tuple, also derived from content of that component, are a value for the attribute, and the user role that affects or controls the attribute. Such user role will generally belong to either the API consumer or the API provider. An exemplary data tuple comprising these data elements is shown and described hereinafter, in connection with FIG. 3.

It will be appreciated that the above process of steps 202-212 can be carried out as an automated process, for each of successive components of the ToS of an API provider, to generate a data tuple for each component. Moreover, if multiple API providers are being considered to supply an API, the automated process can be applied to each of their ToS. Thus, a significant saving of time and effort may be realized.

Present text analytics and text data mining procedures, which may be used for steps of FIG. 2, may also be able to furnish a measure of the success or accuracy of the content mapping effort. The accuracy, for example, could be expressed as a percentage of confidence level of the mapping. Accordingly, the process of FIG. 2 includes a decision step 214, which responds to the accuracy of the mapping effort at step 212. If the confidence level in the accuracy of such effort exceeds a pre-specified minimum, such as 90% by way of example, the process of FIG. 2 moves to step 216. At step 216, the data tuple derived from the selected ToS component of the API provider is added or routed to the specified data structure, as described hereinafter in connection with FIGS. 3 and 4.

FIG. 2 shows that the decision of step 214 may be made using information pertaining to a standard ToS data structure or model, supplied by a ToS library 218.

If it is determined at decision step 214 that the confidence level of the content mapping is less than 90%, the process of FIG. 2 goes to step 220. At this step, a subject matter expert (SME) refines or adjusts the data tuple mapped from the selected component. The process then goes to step 216. The SME usefully is a person who is very knowledgeable about terms of service that are commonly used in the domain which applies to the API of the API provider.

FIG. 2 further shows refinements made by the SME at step 220 being used to update a repository 222, which pertains to components and rules of the pertinent domain. The domain 222 is managed by an expert 224.

Referring to FIG. 3, there is shown an exemplary embodiment of the specified data structure described above, wherein the data structure comprises a table 302 and a table 304. Table 302 contains information representing ToS requirements of an API consumer. Table 304 contains information acquired from a selected ToS component of an API provider, by implementing respective steps shown and described above in connection with FIGS. 1 and 2.

Table 304 more particularly includes data tuples 306-310, which are each an example of a data tuple generated by steps 210-212 as described above in connection with FIG. 2. Thus, each of the data tuples 306-310 has three data elements, respectively comprising attribute, value and user role elements.

Table 302 includes data tuples 312-316, which each includes the same data elements as the tuples 306-310. Accordingly, each tuple 312-316 has three data elements, respectively comprising attribute, value and user role elements. Moreover, the attribute of each tuple 312-316 matches the attribute of a corresponding one of the tuples 306-310. The tuples 306-310 and 314-318 therefore pertain to components of the same subject matter, of their respective ToS.

It will be seen that by providing the data structure of FIG. 3 with two tables, and by entering respective data tuples into the tables as shown, each tuple 306-310 can be readily compared with its corresponding tuple 312-316. Differences between the ToS content represented by the corresponding tuples can then be determined. Steps of a process for comparing corresponding tuples, in order to determine any differences or gaps between them, is shown and described in connection with FIG. 4.

FIG. 3 shows further that each tuple 312-316 of table 302 includes an additional element. This is a requirement which indicates whether the corresponding attribute is optional or mandatory.

Figure 4:
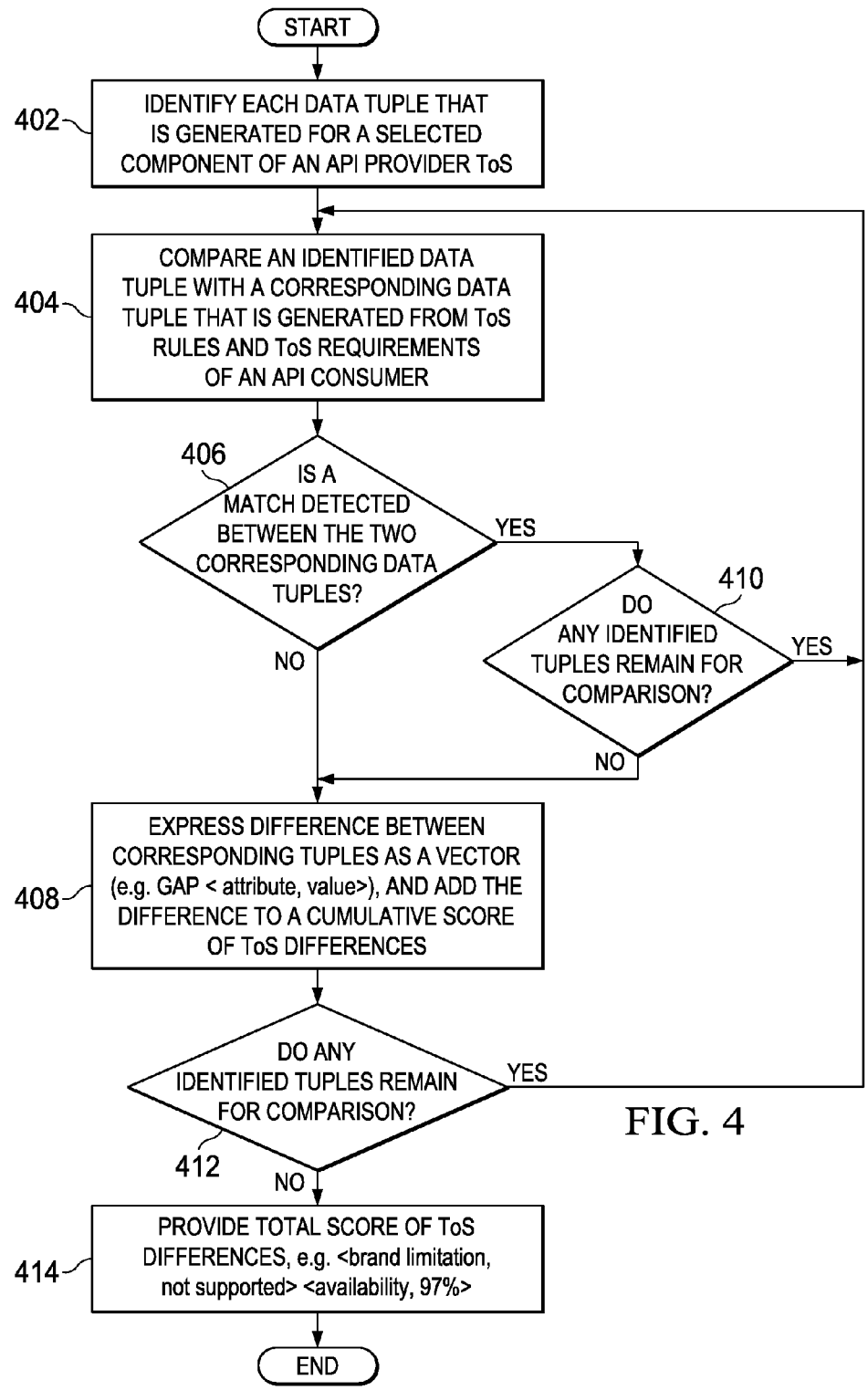
FIG. 4 is a flowchart showing steps of a process pertaining to assessment of ToS gaps or differences.

Referring to FIG. 4, there are shown steps of a process for computing or determining differences between the ToS requirements of an API consumer, and the ToS of an API provider. The process of FIG. 4 may, for example, be used in implementing step 114 of FIG. 1. The process of FIG. 4 more particularly compares data tuples exemplified by tuples 306-310 with corresponding tuples exemplified by tuples 312-316, as respectively described above.

At step 402, the process of FIG. 4 identifies each data tuple that is generated for a selected component of an API provider ToS. An identified data template is then compared at step 404 with a corresponding data tuple that is generated from ToS rules and ToS requirements of an API consumer.

Decision step 406 determines whether or not a match is detected between the two corresponding data tuples. A match occurs only if the data elements of a tuple are all respectively identical to the data elements of the corresponding tuple. This, of course, indicates that there are no differences or conflicts between the two corresponding tuples. If decision step 406 provides a negative result the process of FIG. 4 goes to step 408, and otherwise proceeds to decision step 410.

Step 410 determines whether or not there are any more data tuples pertaining to the selected component of the provider ToS that still need to be compared with their corresponding data tuples. If there are, the process of FIG. 4 returns to step 404, and otherwise proceeds to step 408.

At step 408, the difference between the corresponding tuples compared at step 404 is expressed as a vector, which usefully has the form shown at step 408. Step 408 also adds the difference to a cumulative score of ToS differences.

Decision step 412 determines whether or not there are any more data tuples pertaining to the selected component of the provider ToS that still need to be compared with their corresponding data tuples. If there are, the process of FIG. 4 returns to step 404, and otherwise proceeds to step 414. Step 414 then provides the total score of the ToS differences, and the method ends. As an example of the total score of differences between the ToS of the API consumer and provider, FIG. 4 shows differences in regard to availability and brand limitation. In comparing data tuples 312 and 306 which pertain to availability, it is seen that the API provider ToS only provides 97% availability, rather than the 99.9% required by the consumer ToS. In comparing data tuples 316 and 310 pertaining to brand limitation by the provider, the provider ToS does not limit, and thus does not support, brand limitation, in contrast to the corresponding ToS requirement of the API consumer.

Figure 5:
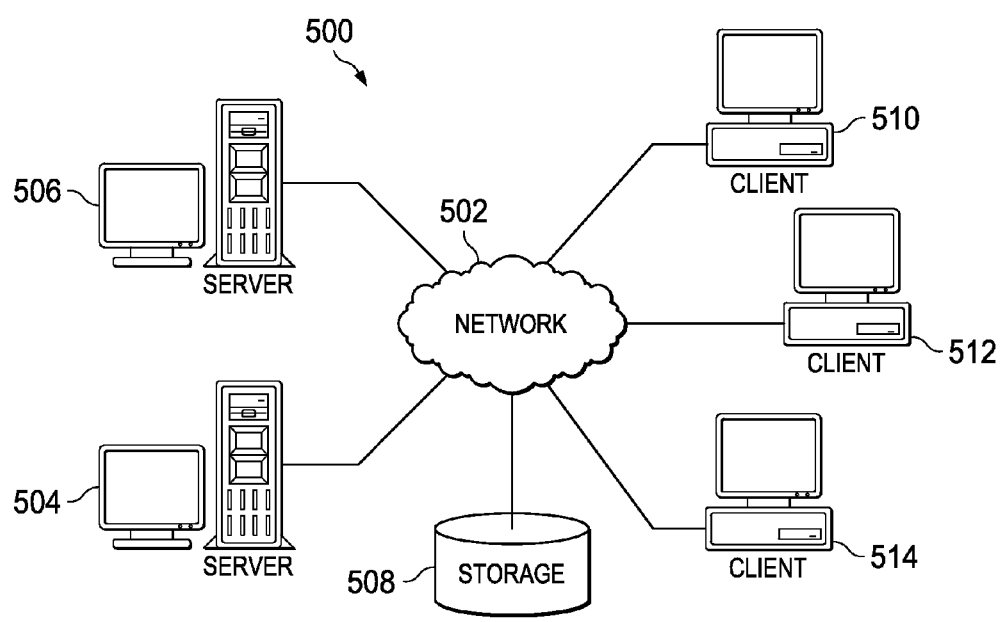
FIG. 5 is a block diagram showing a network of data processing systems in which an embodiment of the invention may be implemented.

FIG. 5 is a pictorial representation of a network of data processing systems in which illustrative embodiments of the invention may be implemented. Network data processing system 500 is a network of computers in which the illustrative embodiments may be implemented. Network data processing system 500 contains network 502, which is the medium used to provide communications links between various devices and computers connected together within network data processing system 500. Network 502 may include connections, such as wire, wireless communication links, or fiber optic cables.

In the depicted example, server computer 504 and server computer 506 connect to network 502 along with storage unit 508. In addition, client computers 510, 512, and 514 connect to network 502. Client computers 510, 512, and 514 may be, for example, personal computers or network computers. In the depicted example, server computer 504 provides information, such as boot files, operating system images, and applications to client computers 510, 512, and 514. Client computers 510, 512, and 514 are clients to server computer 504 in this example. Network data processing system 500 may include additional server computers, client computers, and other devices not shown.

Program code located in network data processing system 500 may be stored on a computer-recordable storage medium and downloaded to a data processing system or other device for use. For example, program code may be stored on a computer-recordable storage medium on server computer 504 and downloaded to client computer 510 over network 502 for use on client computer 510.

In the depicted example, network data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 500 also may be implemented as a number of different types of networks, such as, for example, an intranet, a local area network (LAN), or a wide area network (WAN). FIG. 5 is intended as an example, and not as an architectural limitation for the different illustrative embodiments.

Figure 6:
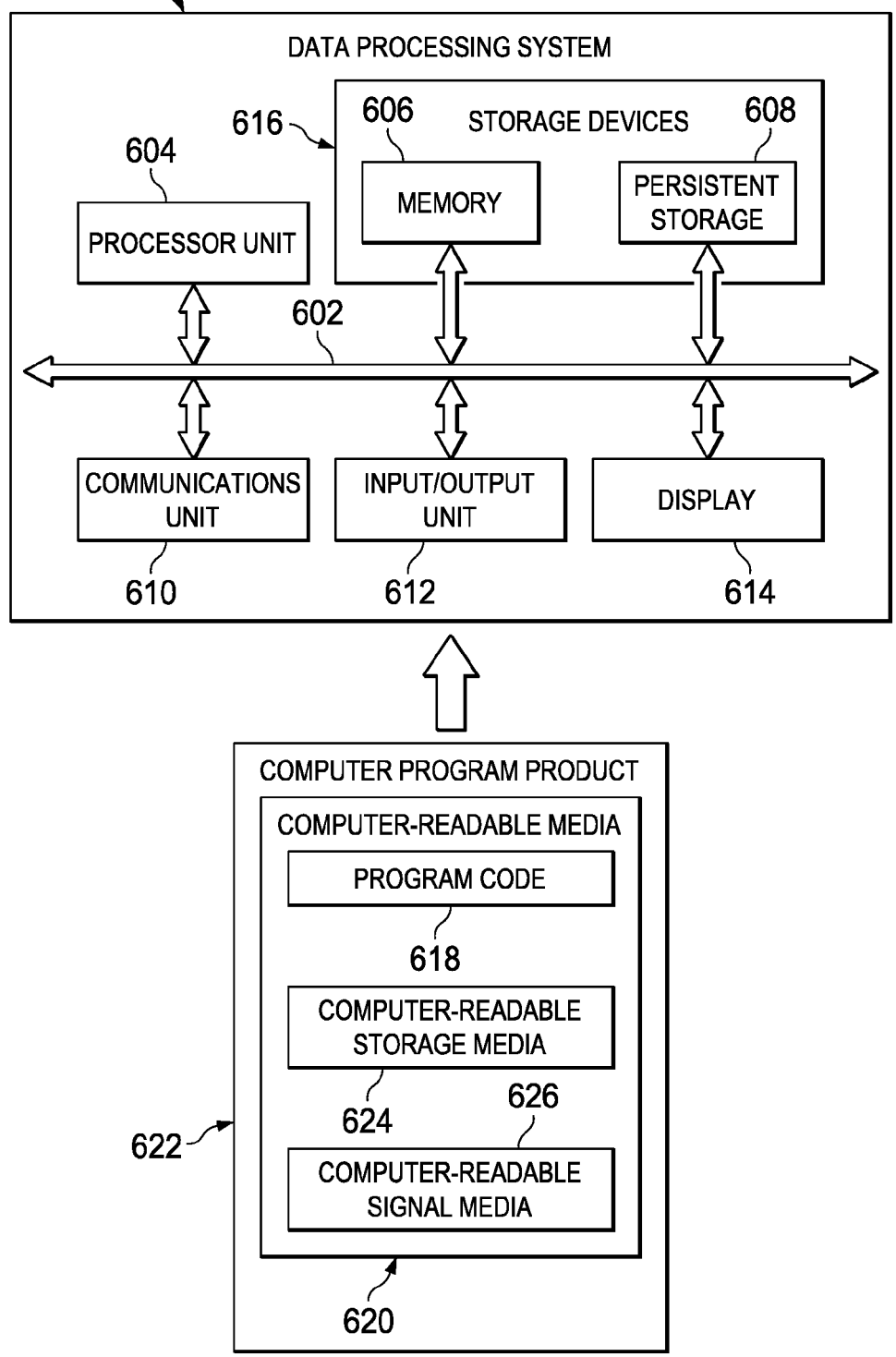
FIG. 6 is a block diagram showing a computer or data processing system that may be used in implementing embodiments of the invention.

Turning now to FIG. 6, an illustration of a data processing system is depicted in accordance with an illustrative embodiment. In this illustrative example, data processing system 600 includes communications fabric 602, which provides communications between processor unit 604, memory 606, persistent storage 608, communications unit 610, input/output (I/O) unit 612, and display 614.

Processor unit 604 serves to process instructions for software that may be loaded into memory 606. Processor unit 604 may be a number of processors, a multi-processor core, or some other type of processor, depending on the particular implementation. "A number," as used herein with reference to an item, means one or more items. Further, processor unit 604 may be implemented using a number of heterogeneous processor systems in which a main processor is present with secondary processors on a single chip. As another illustrative example, processor unit 604 may be a symmetric multi-processor system containing multiple processors of the same type.

Memory 606 and persistent storage 608 are examples of storage devices 616. A storage device is any piece of hardware that is capable of storing information, such as, for example, without limitation, data, program code in functional form, and/or other suitable information either on a temporary basis and/or a permanent basis. Storage devices 616 may also be referred to as computer readable storage devices in these examples. Memory 606, in these examples, may be, for example, a random access memory or any other suitable volatile or non-volatile storage device. Persistent storage 608 may take various forms, depending on the particular implementation.

For example, persistent storage 608 may contain one or more components or devices. For example, persistent storage 608 may be a hard drive, a flash memory, a rewritable optical disk, a rewritable magnetic tape, or some combination of the above. The media used by persistent storage 608 also may be removable. For example, a removable hard drive may be used for persistent storage 608.

Communications unit 610, in these examples, provides for communications with other data processing systems or devices. In these examples, communications unit 610 is a network interface card. Communications unit 610 may provide communications through the use of either or both physical and wireless communications links.

Input/output unit 612 allows for input and output of data with other devices that may be connected to data processing system 600. For example, input/output unit 612 may provide a connection for user input through a keyboard, a mouse, and/or some other suitable input device. Further, input/output unit 612 may send output to a printer. Display 614 provides a mechanism to display information to a user.

Instructions for the operating system, applications, and/or programs may be located in storage devices 616, which are in communication with processor unit 604 through communications fabric 602. In these illustrative examples, the instructions are in a functional form on persistent storage 608. These instructions may be loaded into memory 606 for processing by processor unit 604. The processes of the different embodiments may be performed by processor unit 604 using computer-implemented instructions, which may be located in a memory, such as memory 606.

These instructions are referred to as program code, computer usable program code, or computer readable program code that may be read and processed by a processor in processor unit 604. The program code in the different embodiments may be embodied on different physical or computer readable storage media, such as memory 606 or persistent storage 608.

Program code 618 is located in a functional form on computer readable media 620 that is selectively removable and may be loaded onto or transferred to data processing system 600 for processing by processor unit 604. Program code 618 and computer readable media 620 form computer program product 622 in these examples. In one example, computer readable media 620 may be computer readable storage media 624 or computer readable signal media 626.

Computer readable storage media 624 may include, for example, an optical or magnetic disk that is inserted or placed into a drive or other device that is part of persistent storage 608 for transfer onto a storage device, such as a hard drive, that is part of persistent storage 608. Computer readable storage media 624 also may take the form of a persistent storage, such as a hard drive, a thumb drive, or a flash memory, that is connected to data processing system 600.

In some instances, computer readable storage media 624 may not be removable from data processing system 600. In these examples, computer readable storage media 624 is a physical or tangible storage device used to store program code 618 rather than a medium that propagates or transmits program code 618. Computer readable storage media 624 is also referred to as a computer readable tangible storage device or a computer readable physical storage device. In other words, computer readable storage media 624 is media that can be touched by a person.

Alternatively, program code 618 may be transferred to data processing system 600 using computer readable signal media 626. Computer readable signal media 626 may be, for example, a propagated data signal containing program code 618. For example, computer readable signal media 626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 618 may be downloaded over a network to persistent storage 608 from another device or data processing system through computer readable signal media 626 for use within data processing system 600. For instance, program code stored in a computer readable storage medium in a server data processing system may be downloaded over a network from the server to data processing system 600. The data processing system providing program code 618 may be a server computer, a client computer, a remote data processing system, or some other device capable of storing and transmitting program code 618. For example, program code stored in the computer readable storage medium in data processing system 600 may be downloaded over a network from the remote data processing system to the computer readable storage medium in data processing system 600. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with an API marketplace, wherein one or more API providers can each supply an API of a specified type, and each API provider has a set of Terms of Service (ToS) for its API of the specified type, a computer implemented method comprising the steps of:
   responsive to an API consumer having a need for an API of the specified type, obtaining the ToS of at least a given one of the API providers;
   implementing an automated process to generate a set of data elements from selected content of the ToS of the given API provider; and
   selectively using the set of data elements with a specified data structure to determine differences between the ToS of the given API provider, and a ToS of the API consumer.

2. The method of claim 1, wherein:
   differences are determined between the ToS of each of multiple API providers and the ToS of the API consumer, and the ToS differences determined for each of the multiple API providers are used to decide whether to select a particular one of the API providers to supply an API of the specified type to the API consumer.

3. The method of claim 1, wherein:
   keywords, derived from selected content of the ToS of the API consumer, are used in generating the set of data elements.

4. The method of claim 1, wherein:
   the set of data elements is generated by selectively parsing selected content extracted from the ToS of the given API provider.

5. The method of claim 1, wherein:
   the set of data elements is generated by applying a specified text analytics procedure to selected content of the ToS of the given API provider.

6. The method of claim 5, wherein:
   the ToS of the given API provider comprises multiple components, and the selected content, to which the specified text analytics procedure is applied, is included in a specified one of the components.

7. The method of claim 1, wherein:
   selected content of the ToS of the API consumer is used in constructing the specified data structure.

8. The method of claim 1, wherein:
   the set of data elements comprises a first data tuple that pertains to a specified attribute of selected content of the ToS of the given API provider.

9. The method of claim 8, wherein:
   the specified data structure is used to determine differences between information respectively contained in the first data tuple and in a second data tuple, wherein the second data tuple represents selected content of the ToS of the API consumer, and pertains to the specified attribute.

10. The method of claim 9, wherein:
the specified data structure comprises a set of tables for use in determining differences between information respectively contained in the first data tuple and the second data tuple.

11. The method of claim 9, wherein:
the specified data structure comprises a relationship graph model.

12. The method of claim 1, wherein:
differences between the ToS of each of multiple API providers and the ToS of the API consumer are respectively determined, wherein a numerical value representing the total ToS differences is computed for each API provider, and each API provider can supply an API of the specified type.

13. The method of claim 12, wherein:
the API provider having a numerical value that represents the least total ToS differences is selected to supply an API of the specified type to the API consumer.

14. The method of claim 1, wherein:
a level of confidence of the accuracy of information contained in the set of data elements is selectively computed, and the set of data elements is routed to the specified data structure only if the level of confidence exceeds a pre-specified minimum level.

15. In association with an API marketplace, wherein one or more API providers can each supply an API of a specified type, and each API provider has a set of Terms of Service (ToS) for its API of the specified type, a computer program product executable in a recordable storage medium comprising:
instructions responsive to an API consumer having a need for an API of the specified type, for obtaining the ToS of at least a given one of the API providers;
instructions for implementing an automated process to generate a set of data elements from selected content of the ToS of the given API provider; and
instructions for selectively using the set of data elements with a specified data structure to determine differences between the ToS of a given provider, and a ToS of the API consumer.

16. The computer program product of claim 15, wherein:
differences are determined between the ToS of each of multiple API providers and the ToS of the API consumer, and the ToS differences determined for each of the multiple API providers are used to decide whether to select a particular one of the API providers to supply an API of the specified type to the API consumer.

17. The computer program product of claim 15, wherein:
keywords, derived from selected content of the ToS of the API consumer, are used in generating the set of data elements.

18. The computer program product of claim 15, wherein:
the set of data elements are generated by selectively parsing selected content extracted from the ToS of the given API provider.

19. The computer program product of claim 15, wherein:
selected content of the ToS of the API consumer is used in constructing the specified data structure.

20. In association with an API marketplace, wherein one or more API providers can each supply an API of the specified type, and each API provider has a set of Terms of Service (ToS) for its API of the specified type, a computer system comprising:
a bus;
a memory connected to the bus, wherein program code is stored on the memory; and
a processor connected to the bus, wherein the processor unit executes the program code:
responsive to an API consumer having a need for an API of the specified type, to obtain the ToS of at least a given one of the API providers;
to implement an automated process in order to generate a set of data elements from selected content of the ToS of the given API provider; and
to selectively use the set of data elements with a specified data structure to determine differences between the ToS of the given provider, and ToS of the API consumer.

\* \* \* \* \*